(12) United States Patent
Lee (10) Patent No.: US 10,872,135 B2
(45) Date of Patent: Dec. 22, 2020

(54) USER AUTHENTICATION METHOD AND AUTHENTICATION SYSTEM USING MATCH WITH JUNK DATA

(71) Applicant: Myeong Ho Lee, Bucheon (KR)

(72) Inventor: Myeong Ho Lee, Bucheon (KR)

(*) Notice: Subject to any disclaimer, the term of this patent is extended or adjusted under 35 U.S.C. 154(b) by 322 days.

(21) Appl. No.: 16/077,737

(22) PCT Filed: Feb. 13, 2017

(86) PCT No.: PCT/KR2017/001547
§ 371 (c)(1),
(2) Date: Aug. 14, 2018

(87) PCT Pub. No.: WO2017/142271
PCT Pub. Date: Aug. 24, 2017

(65) Prior Publication Data
US 2019/0080060 A1  Mar. 14, 2019

(30) Foreign Application Priority Data

Feb. 16, 2016 (KR) .................. 10-2016-0017561
Nov. 14, 2016 (KR) .................. 10-2016-0150877

(51) Int. Cl.
*H04L 29/06* (2006.01)
*G06F 21/00* (2013.01)
(Continued)

(52) U.S. Cl.
CPC ........ *G06F 21/31* (2013.01); *G06F 16/90344* (2019.01); *G06F 21/46* (2013.01);
(Continued)

(58) Field of Classification Search
CPC .... G06F 21/31; G06F 16/90344; G06F 21/46; G06F 2221/2133; H04W 12/06;
(Continued)

(56) References Cited

U.S. PATENT DOCUMENTS

2006/0136737 A1* 6/2006 Bauchot .................. G06F 21/31
713/183
2009/0193859 A1* 8/2009 Kwon .................... E05B 47/026
70/91
2015/0205942 A1* 7/2015 Yang .................... H04L 63/083
726/19

FOREIGN PATENT DOCUMENTS

JP     2011-113523 A     6/2011
JP     2009-272382    *  9/2011
(Continued)

*Primary Examiner* — Lisa C Lewis
(74) *Attorney, Agent, or Firm* — Patent Office of Dr. Chung Park (57) ABSTRACT

The present invention relates to a technique of authenticating a user by using junk data randomly generated when a password is inputted. According to the present invention, a password is received from a user and is stored, and it is determined whether a password matches with an original password stored in a memory among junk data and a password inputted together in a user authentication step. At this time, if a password including the junk data matches, by at least a certain length or more, a password including junk data inputted in a previous authentication step, user authentication fails even if the separately extracted passwords match each other, such that security can be further enhanced.

13 Claims, 6 Drawing Sheets

(a)

(b)

(c)

(d)

(51) Int. Cl.
*G06F 21/31* (2013.01)
*G06F 21/46* (2013.01)
*G06K 9/72* (2006.01)
*G06F 16/903* (2019.01)
*H04W 12/06* (2009.01)

(52) U.S. Cl.
CPC .............. *G06K 9/72* (2013.01); *H04L 63/083* (2013.01); *H04W 12/06* (2013.01); *G06F 2221/2133* (2013.01); *H04L 2463/082* (2013.01)

(58) Field of Classification Search
CPC ... G06K 9/72; H04L 63/083; H04L 2463/082; H04L 9/3228; G06Q 20/40
See application file for complete search history.

(56) References Cited

FOREIGN PATENT DOCUMENTS

| | | | |
|---|---|---|---|
| KR | 10-2011-0051174 A | | 5/2011 |
| KR | 10-2012-0010602 A | | 2/2012 |
| KR | 1020150113366 | * | 8/2015 |
| KR | 10-2015-0113366 B1 | | 10/2015 |

* cited by examiner

JD (Junk Data)    PW (Password)

| INPUT ORDER | Digits (up to 20) | TYPE OF PATTERN |
|---|---|---|
| a | 3 3 4 6 2 0 1 6 3 7 7 | C pattern |
| b | 2 0 1 6 3 3 2 1 1 | B pattern |
| c | 2 0 1 6 2 2 1 0 3 4 5 7 8 3 4 4 | B pattern |
| d | 7 7 1 0 3 4 5 2 0 1 6 | A pattern |
| e | 2 0 1 6 | USE ONLY PASSWORD |
| f | 1 2 3 3 2 0 1 6 1 3 3 1 | C pattern |
| g | 5 5 5 6 1 1 3 6 7 7 2 0 1 6 | A pattern |
| h | 3 2 5 2 0 1 6 1 1 2 3 4 | ← EXPOSED TO SURROUNDINGS — C pattern |
| i | 2 0 1 6 1 1 2 3 4 | B pattern |
| j | 9 9 0 2 0 1 6 6 2 1 9 9 9 8 | C pattern |
| k | 2 0 1 6 | USE ONLY PASSWORD |
| l | 1 1 2 3 2 0 1 6 | A pattern |
| m | 2 0 1 6 | USE ONLY PASSWORD |
| n | 0 0 2 1 7 8 2 0 1 6 1 1 1 2 6 6 7 5 5 | C pattern |
| o | 3 2 5 2 0 1 6 1 1 2 3 4 | → SAME DATA VALUE USED |
| p | REQUEST SECONDARY PASSWORD INPUT | WARN HACKING AND ILLEGAL LEAKAGE |

FIG.6

USER AUTHENTICATION METHOD AND AUTHENTICATION SYSTEM USING MATCH WITH JUNK DATA

CROSS-REFERENCE TO PRIOR APPLICATIONS

This application is a national Stage Patent Application of PCT International Patent Application No. PCT/KR2017/001547, filed on Feb. 13, 2017 under 35 U.S.C. § 371, which claims priority of Korean Patent Application Nos. 10-2016-0017561 and 10-2016-0150877, filed on Feb. 16, 2016 and Nov. 14, 2016, respectively, which are all hereby incorporated by reference in their entirety.

BACKGROUND OF THE INVENTION

Field of the Invention

The present invention relates to a password authentication technology of preventing password hacking and exposure using junk data.

Related Art

Passwords are the most widely used for user authentication in various kinds of offline and online security fields. A password is a set of characters known only to a user, and a system that uses the password for authentication is a password system.

Generally, a user authentication technology refers to a technology used to determine an authorized user whose access is allowed.

The password system to which the user authentication technology is applied is widely used for hardware products such as a door lock of an entrance which is generally used most commonly, a door lock of a safe, and a door lock of a vehicle, and for unlocking at the operation start of various kinds of user terminals such as a notebook computer, a personal computer (PC), a tablet PC and a smart phone. Also, the password systems are frequently used for personal authentication through user authentication systems established at each site on a network. In addition, the password systems using characters are being widely used in automated devices such as automated teller machines (ATMs) and civil affair document issuers, financial institutions and public institutions requiring personal authentication, as well as authentication and e-commerce on various websites, various online financial settlements, and financial services.

In particular, as e-commerce and financial transaction through smart phones become generalized and realized due to the development of information communication and the rapid spread of smart phones, the importance of the information stored in a personal terminal becomes bigger.

In addition, the connection between devices due to the emergence of wearable devices such as smart watch and smart band which measure and store personal health information and activity information in real-time and Internet of Things (IoT) which realizes smart home and connected car technology makes the unlocking and user authentication of devices that control this connection more important. Accordingly, the user authentication using a password and the safety assurance and security enhancement according thereto become more important.

A user authentication technology of a password (password number key) input method is the most widely used among the user authentication technologies according to the related art. This is because the user authentication technology of the password input method has both simplicity required for passwords and a certain level of security. However, security becomes weaker due to the emphasis on simplicity (e.g., 4-digit numbers). For this reason, users are required to use more digits (e.g., more than 8 digits), capital letters, and special characters, and periodically change the password. This causes enhancement of the security, but at the same time, inconvenience in the use of the device is incurred, and the adverse effects of loss and forgetting of password, input error, and input time delay incur inconveniences, causing disregarding of users and security concerns.

For example, at the time of online financial service or commodity payment, when two months known as a proper password validity period (password lifetime) related to password security passes, a user is notified of "change password" upon user authentication, but most users ignore this recommendation and use the current password as it is, or in some cases, create two passwords and alternately use the two passwords. Creating a new password every two months, remembering all the passwords, and using different passwords in different authentication systems are ideas that ignore or disregard the user characteristics or user behavior style. These just seem like the procedure and intention to shift responsibility on to users or avoid administrative regulations. Accordingly, this is nothing more than recording a number of new passwords that occur multiple times, storing passwords in different places, or ignoring the password change recommendation.

In addition, in the case of authentication technology using passwords which is the most commonly used, the biggest limitation is that the password is exposed to the surroundings or the surrounding people by the shoulder surfing obtaining passwords by looking over the user's shoulder when the password is inputted on a personal terminal. Also, there is a limitation in that security becomes weak due to a finger trace left on a keypad of an entrance door or a touch screen of a personal terminal, a guessing attack for detecting a password by tracking such a slight exposure or trace, or an exposure to a secretly installed camera (hereinafter, referred to as a hidden camera).

As another user authentication technology according to the related art, a user authentication technology for drawing a password pattern on a touch screen of a terminal such as a smart phone is being used. This technology is considered to effectively prevent an exposure to the surroundings in that it is more convenient to use than a technology of finding and inputting characters, a quick input operation is possible, and the numbers of the password input key are not visible to the outside. However, since the used patterns are relatively simple forms, this authentication technology is not safe from exposure to the surroundings or shoulder surfing, and particularly, a password pattern trace is intactly left on the screen, which unintentionally exposes the password to the outside.

As another user authentication technology for overcoming these limitations, a biometrics user authentication technology using biometric information (fingerprint, face, iris, vein, voice, etc.) has been proposed. However, this technology takes a lot of cost and time to construct a system, and requires a careful attention upon user registration and authentication. Also, as an alternative in case of an input and authentication error, it requires a password input again, which results in two authentication processes, making a user hassle. Eventually, this means that these technologies recognized as new technologies return to the basic password input method at the verification and use stages.

In particular, since no security measures are taken for the password input system used in this case, the biometric system, which is a perfect security system for preventing the exposure to the surroundings, finally neglects the weakness of the security against the exposure along with an irony of depending on the password input system which is vulnerable to the exposure.

In addition, the biometrics user authentication technology made up of new techniques is inevitably a new technology unfamiliar to users, and the rejection and adaptation period of users due to application of this technology is long. Also, it is difficult to popularize and widely distribute this technology within a short period due to device replacement and economic limitations. In addition, since other limitations are incurred in terms of security and safety, verification and countermeasures against the limitations are needed.

For example, in the case of recently commercialized fingerprint authentication, fingerprints may easily be stolen by others when a user is intoxicated or sleeping. Also, when the user's hand is stained with foreign substances such as sweat, water, cosmetics, and paint, there are other limitations for use such as authentication errors and silicon fingerprinting, and thus there is still a need for a lot of verification procedures.

Actually, for the reasons that biometric information differs from individual to individual and the security is high due to low exposure concern, biometric authentication system is attracting attention due to the favorable feeling for new technology and the marketing effect. However, by hacking, an incident in which millions of fingerprint information is leaked in large quantities from an American public institution occurs, and the tight security of the latest smartphones mounted with fingerprints is being compromised by the illegal use of the imitation fingerprint using silicone in less than two years after their release in Korea.

Recently, once the vein recognition authentication system and the iris recognition authentication system are hacked, it is impossible to change or replace the unique biometric information of each individual. When the biometric information is stolen in that the biometric information is personal physical information that does not change during lifetime, the biometric information may be misused in the primary crimes such as hacking and password illegal use and other crimes such as fake passports and identity laundering. Accordingly, since there is no social discussion according to anxiety about the misuse of personal biometric information in crimes and the problems of storing and using personal biometric information and there is no thorough verification that needs to be performed in various situations for a long time, the biometric authentication systems still show the limitations for use along with maladjustment and anxiety of users.

Due to these limitations in the verification, convenience and user adaptation of the new technology and economic and social limitations of the new technology, the user authentication technology which enhances the security for the password using characters which are generally used without the sense of resistance is being adopted. For example, as recent user authentication technologies according to the related art, a One Time Password (OTP) applied to Fin-Tech and an authentication method of randomly arranging numbers and inputting a password using a virtual keyboard are being used.

Since this technology can prevent keylogger, it is classified as having a higher security level than other user authentication technologies, and is widely used for finance-related authentication on the Internet and smart phones. Due to advantages such as user adaptation and convenience, long-term verification, ease of introduction and economical reason compared with adoption of different new technology, the password authentication method using characters (numbers), which is the most common method, is adopting the authentication technology with enhanced security.

However, in the random keyboard method using the virtual keyboard, since characters are randomly rearranged at every use to prevent the position values of the input keys from being stolen, inconvenience of a user is incurred, and the readability and intuition of the characters are reduced, causing another limitation of being more vulnerable to surrounding exposure. A new random password input method has been proposed to prevent keylogging while increasing readability and user convenience by inserting random blank spaces between the password input keys to improve the above limitation. This method is mainly used for financial transaction and shopping settlement using mobile and internet.

However, also in this method, the inputted password can be stolen by capturing the changed input key position. The bigger limitation is that both the OTP and the password system using the random keyboard method have a security limitation in that the surrounding exposure or shoulder surfing which is the biggest limitation when entering the password cannot be fundamentally prevented.

The limitation that security cannot be maintained by the exposure to surrounding observers is well known. In order to overcome this limitation, a police station in Seoul distributes, to each family as a precaution against the surrounding exposure, a paper cover capable of covering hand motion when a password is inputted into a digital door lock of an entrance door which is the most common target of crime by the surrounding exposure. (Feb. 5, 2016, refer to the newspaper article of Hankook Ilbo). This is a ridiculous way of using a sophisticated door lock that costs hundreds of dollars in a paper box. In ATMs where similar crimes are common, a user is notified of a warning of "Please be sure to enter your password after covering it with your hand or book such that it is not exposed to others or cameras", but it is merely a passive prevention. In online user authentication, asterisks (****) are used to hide a password on a monitor, but all of them cannot fundamentally prevent the surrounding exposure, shoulder surfing, and hand motion exposure that may occur at any time. These are also the irresponsible behaviors of security officials who know the damage caused by these limitations but do not offer any active solution.

In addition, as an example of actively preventing shoulder surfing and surrounding exposure which is recently common, a button for inputting a password and a cover panel around the liquid crystal monitor are installed on a password input keypad provided for a customer in the financial institution. However, this password input keypad is also intended to block surrounding exposure or shoulder surfing which is easy to occur when entering short and simple numeric passwords, and is being routinely and simply used in almost all banks.

Thus, since it has been proven that even a single simple panel can effectively prevent surrounding exposure even if passwords or complex password systems are not specially or difficultly changed, the password input keypad with the cover panel is being widely used in all commercial bank windows. However, the password input keypad with the cover panel has a restriction in terms of place to be provided and used for a user, and cannot be applied to an ATM or a personal terminal such as a mobile phone, a notebook, and the like.

Another thing to pay attention in the password authentication method through the character (number) input is the processing of the erroneous input information that occurs when the password is inputted. Generally, when inputting the password, anyone experiences a password input error several times due to forgetting (lost password), confusion, input mistake, and input time delay.

This is primarily due to the fact that the requirements of the password values required by many authentication systems that require password input are not unified, and are each different from each other like the use of 4 digits, 6 digits, 8 digits, or a combination of numbers and characters. In addition, as the importance of security has become more important in recent years, it has become necessary to frequently replace passwords, to require a password having a large number of digits (8 digits or more), to mix capital letters, small letters, and special characters. Since it is natural that security becomes more difficult when the use (convenience) becomes difficult, this is a phenomenon that the password-related developers do not worry about it, deliberately neglect, and shift responsibility to a user, thereby causing frequent password input error.

While password values are inputted many times in an illegal hacking attempt in addition to the above-mentioned user input error, the inputted password values are processed as useless data and a re-input of the password is requested. That is, erroneous data which is inevitably generated whenever a password is inputted is classified as junk data and has been treated as useless. Thus, due to awareness and customary behavior of its uselessness, the junk data, i.e., an erroneous data which is abandoned upon the password authentication is not being stored, managed, classified and analyzed, and is not being utilized as risk data for development of authentication technology.

Big Data, which is currently being highlighted, is more focused on data analysis and finding of meaningful value data than collection. With the development of IT, the data that is massively produced hourly is considered to be useless and has been mostly neglected. However, this vast amount of data has been variously analyzed and newly born into Google's automatic translation system, supercomputer Watson, Amazon book recommendation system and the like as innovative technologies with powerful force, and the application of Big Data to various marketing activities reached the step of analyzing and predicting users' thoughts and opinions.

As shown in the example of Big Data, data may be newly reborn into core value data with important information according to classification and analysis of data which is involuntarily created and is considered to be useless. Thus, failing to find out value data such as risk data by collecting, analyzing or inducing a large amount of password-related junk data such as error data generated during password authentication attempted several times a day and error data used in hacking attempt means that junk data is not actively used to prevent hacking or enhance security.

SUMMARY OF THE INVENTION

The present invention provides a user authentication system which can prevent surrounding exposure, shoulder surfing, and guessing attack of a password by allowing a user to extemporaneously generate and input junk data of desired digits freely and randomly using a random value before, after, or before and after inputting the password registered as the original password, and by preventing the password value contained in the random junk data from being recognized even when the password input is exposed to the surroundings or an observer watches the input motion.

The present invention also provides a user authentication system which can further enhance security by comparing an inputted password including junk data with a previously inputted password including junk data and by considering the inputted password as hacking when the two passwords match each other by at least a certain length or more.

In one aspect, a user authentication method using a user authentication system includes: (a) receiving a password comprising junk data from a user where the junk data are comprised before, after, or before and after the password; (b) extracting the password excluding the junk data from the received password comprising the junk data; and (c) processing user authentication as a failure even though the extracted password matches a previously stored password when the password comprising the junk data matches, by a critical length, the previously stored password comprising junk data inputted in the past.

In the processing of the user authentication, when the length of the password comprising the junk data inputted from a user is equal to or greater than the critical length, it may be determined whether or not the password comprising the junk data matches the previously stored password comprising junk data inputted in the past, wherein when the length of the password comprising the junk data inputted from a user is less than the critical length, the determination of whether or not the password comprising the junk data matches the previously stored password comprising junk data inputted in the past is omitted, and when the extracted password matches the previously stored password in a storage unit, the user authentication is processed as a success.

In the processing of the user authentication, the critical length may be nine or more digits, and it may be determined whether or not the password comprising the junk data matches the previously stored password comprising junk data inputted in the past, wherein when the password comprising the junk data continuously or discontinuously matches, by the critical length, the previously stored password comprising the junk data inputted in the past, the user authentication may be processed as a failure even though the password matches the previously stored password in a storage unit.

A pattern of junk data comprising the password may include any one of: a pattern comprising junk data formed of a plurality of digits and a password formed of four or more digits; a pattern comprising first junk data formed of a plurality of digits, a password formed of four or more digits, and second junk data formed of a plurality of digits; and a pattern comprising a first password formed of three or more digits, junk data formed of a plurality of digits, and a second password formed of three or more digits.

In the extracting of the password excluding the junk data, one of a string search algorithm, a pattern matching algorithm and a pattern recognition algorithm may be used.

After the processing of the user authentication, the method may further include: (d) displaying a message instructing to input only the password excluding junk data; and (e) determining whether or not the password matches the previously stored password in the storage unit when a password is re-inputted from a user, and when the passwords match each other, the user authentication is processed as a success.

In the determining of whether or not the password matches the previously stored password, when the password re-inputted from a user does not match the previously stored password in the storage unit, a hacking risk warning process may be performed.

In another aspect, a user authentication system using junk data matching includes: an input unit receiving a password and junk data from a user; a storage unit storing instructions to be executed by a processor; and the processor sequentially executing the instructions loaded on the storage unit, wherein the processor, if receiving a password comprising junk data from a user where the junk data are comprised before, after, or before and after the password, extracts the password excluding the junk data from the received password comprising the junk data, and processes user authentication as a failure even though the extracted password matches a previously stored password in the storage unit when the password comprising the junk data matches, by a critical length, the previously stored password comprising junk data inputted in the past.

In still another aspect, a user authentication system using junk data matching includes: a communication adapter transmitting and receiving data through a network; a storage unit storing instructions to be executed by a processor; and the processor sequentially executing the instructions loaded on the storage unit, wherein the communication adapter receives a password comprising junk data from a remote terminal connected through the network where the junk data are comprised before, after, or before and after the password, and the processor extracts the password excluding the junk data from the received password comprising the junk data, and processes user authentication as a failure even though the extracted password matches a previously stored password in the storage unit when the password comprising the junk data matches, by a critical length, the previously stored password comprising junk data inputted in the past.

When the length of the password comprising the junk data inputted from a user is equal to or greater than the critical length, the processor may determine whether or not the password comprising the junk data matches the previously stored password comprising junk data inputted in the past, wherein when the length of the password comprising the junk data inputted from a user is less than the critical length, the processor may omit the determination of whether or not the password comprising the junk data matches the previously stored password comprising junk data inputted in the past, and when the extracted password matches the previously stored password in the storage unit, the processor may process the user authentication as a success.

The processor may determine whether or not the password comprising the junk data matches the previously stored password comprising junk data inputted in the past, and when the password comprising the junk data continuously or discontinuously matches, by the critical length, the previously stored password comprising the junk data inputted in the past, the processor may process the user authentication as a failure even though the extracted password matches the previously stored password in the storage unit, and the critical length may be nine or more digits.

DESCRIPTION OF EXEMPLARY EMBODIMENTS

Terminology used herein will be described briefly, and the present disclosure will be described in detail.

The terminology used herein is defined in consideration of the function of corresponding components used in the present disclosure and may be varied according to users, operator's intention, or practices. In addition, an arbitrary defined terminology may be used in a specific case and will be described in detail in a corresponding description paragraph. Therefore, the terminology used herein is for the purpose of describing particular embodiments only and is not intended to be limiting of the invention.

Throughout the specification, unless explicitly described to the contrary, the word "comprise" and variation such as "comprises" or "comprising" will be understood to imply the inclusion of stated elements but not the exclusion of any other elements. In addition, terms such as "unit," "means," "part," "member," etc., which are described in the specification, means a unit of a comprehensive configuration that performs at least one function or operation, and this may be implemented in hardware or software or implemented as a combination of hardware and software.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Figure 1:
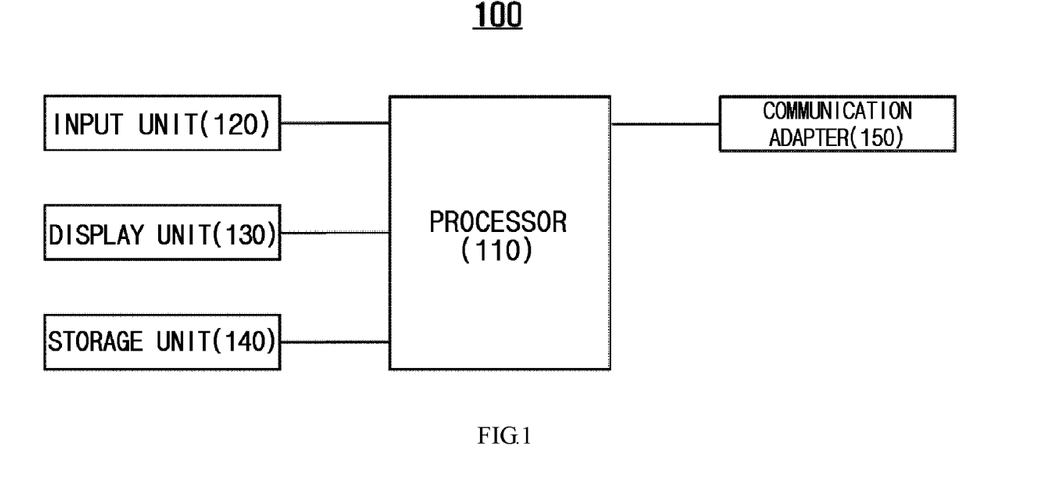
FIG. 1 is a block diagram illustrating a hardware configuration of a user authentication system according to an embodiment of the present invention.

FIG. 1 is a block diagram illustrating a hardware configuration of a user authentication system according to an embodiment of the present invention.

The user authentication system 100 shown in FIG. 1 includes a processor 110, an input unit 120, a display unit 130, a storage unit 140, and a communication adapter 150.

The processor 110 executes the instructions stored in the storage unit 140. On the other hand, the processor 110 displays a password and junk data inputted through the input unit 120 on the display unit 130, and compares the password and junk data stored in advance in the storage unit 140 to perform user authentication by a user authentication method described later.

The input unit 120 is a peripheral device provided in the user authentication system 100, and receives the password and junk data from the user. There is no limitation in the type of the input unit 120.

For example, the input unit 120 may include a keyboard, a mouse, a touch screen, or the like.

Alternatively, the input unit 120 may be a microphone. A user's voice may be inputted and converted into text data, and may be used as an input value.

In addition, the input unit 120 may be implemented in various forms such as a digital door lock of an entrance door, a keypad installed in a vehicle door or a safe, a remote controller, and a keypad of an automation device such as an Automatic Teller Machine (ATM) and a civil affair document issuer.

The display unit 130 is a device for displaying information to be informed to a user in a visual, audible and tactile manner under the control of the processor 110. The display unit 130 may include a Liquid Crystal Display (LCD), a speaker, and other well-known various types of output devices.

The storage unit 140 may be loaded with a program including instructions to be executed by the processor 110. On the other hand, the storage unit 140 stores a password inputted by a user through the input unit 120 and junk data which are inputted and used together with the password in advance.

The storage unit 140 may include a volatile or non-volatile local storage such as a flash memory or a hard disk, a cloud, a remote server, or a Network Attached Storage (NAS).

The communication adapter 150 is a device for communicating with a remote terminal 200 connected via a network according to a certain communication protocol.

In this case, the network may be various types of wired/wireless communication networks such as an Internet network, an intranet, and a mobile communication network.

The user authentication system 100 is not limited in the hardware type as long as the user authentication system 100 includes the above-described components.

For example, the user authentication system 100 may be a form of a personal computer, a laptop, a smart phone, or a tablet computer, and may be a form of a server connected to a plurality of remote terminals via a network, a smart watch, or other wearable devices.

Figure 2:
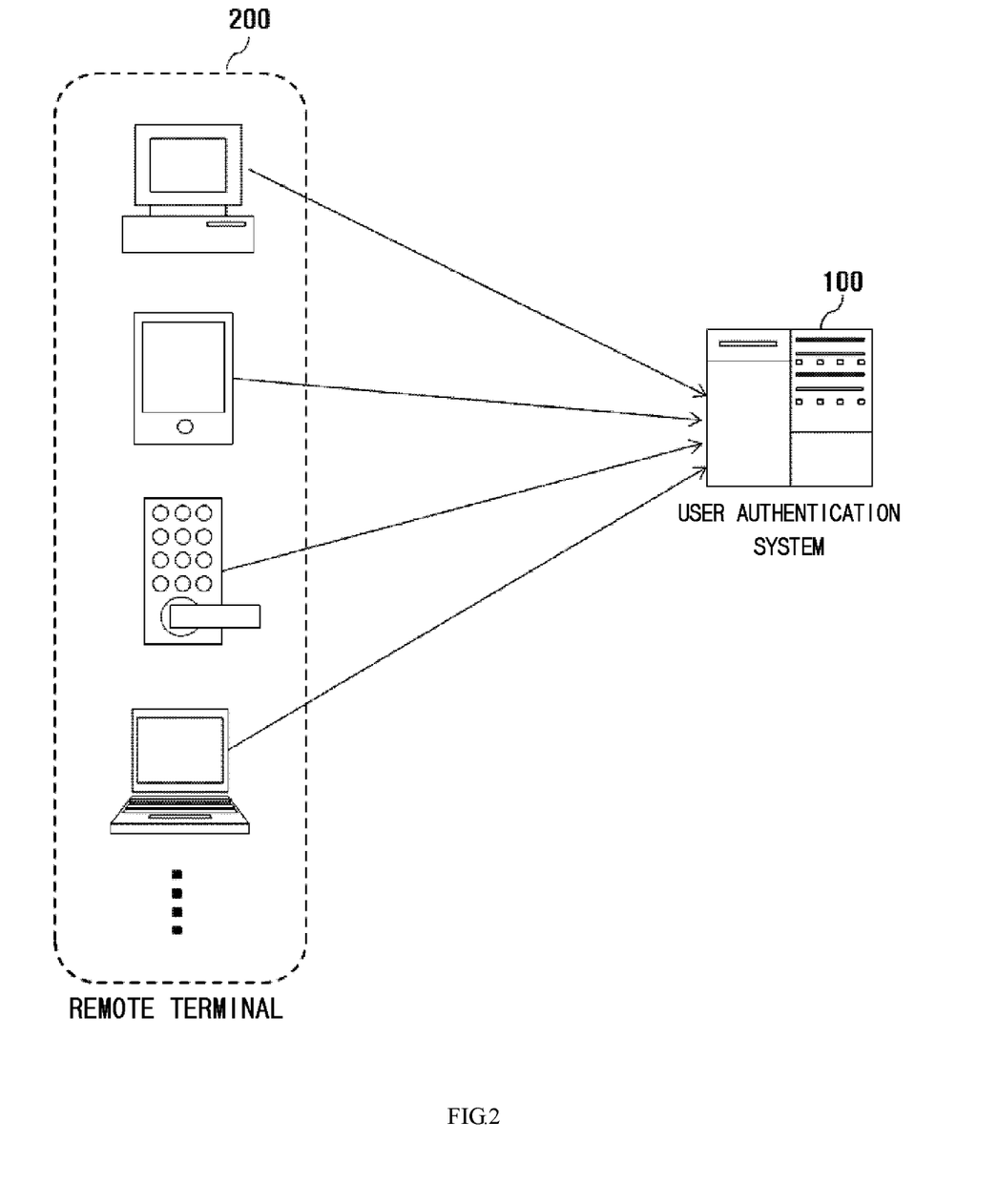
FIG. 2 is a diagram illustrating a connection relationship between a user authentication system and a remote terminal according to an embodiment of the present invention.

FIG. 2 is a diagram illustrating a connection relationship between a user authentication system and a remote terminal according to an embodiment of the present invention.

The user authentication system 100 illustrated in FIG. 2 is connected to a plurality of remote terminals 200 through a network.

A user may directly input data using the input unit 120 provided in the user authentication system 100, but may also input data using the remote terminal 200 connected through the network.

The remote terminal 200 is a unit for communicating with the user authentication system 100 at a remote location and inputting a password and junk data together with the password to the user authentication system 100. The remote terminal 200 may include an automation device such as a smart phone, a personal computer, a digital door lock of an entrance door capable of wired/wireless communication, a vehicle door, a safe, an ATM, and a civil affair issuer which are physically separated from the user authentication system 100.

In addition, the remote terminal 200 may include an Internet of Things (IoT) product such as a gas boiler, a light bulb, a power switch, and a speaker which are capable of wired/wireless communication.

Alternatively, the remote terminal 200 may be an IoT controller connected to a wireless communication network and controlling various kinds of IoT products by a short-range wireless communication method such as Zigbee or Bluetooth.

In addition, the remote terminal 200 may be a form of a mobile device such as a smart phone or a tablet computer interlocking with various IoT products.

Furthermore, there is no limitation in the type of hardware if the remote terminal 200 satisfies the above definition.

Figure 3:
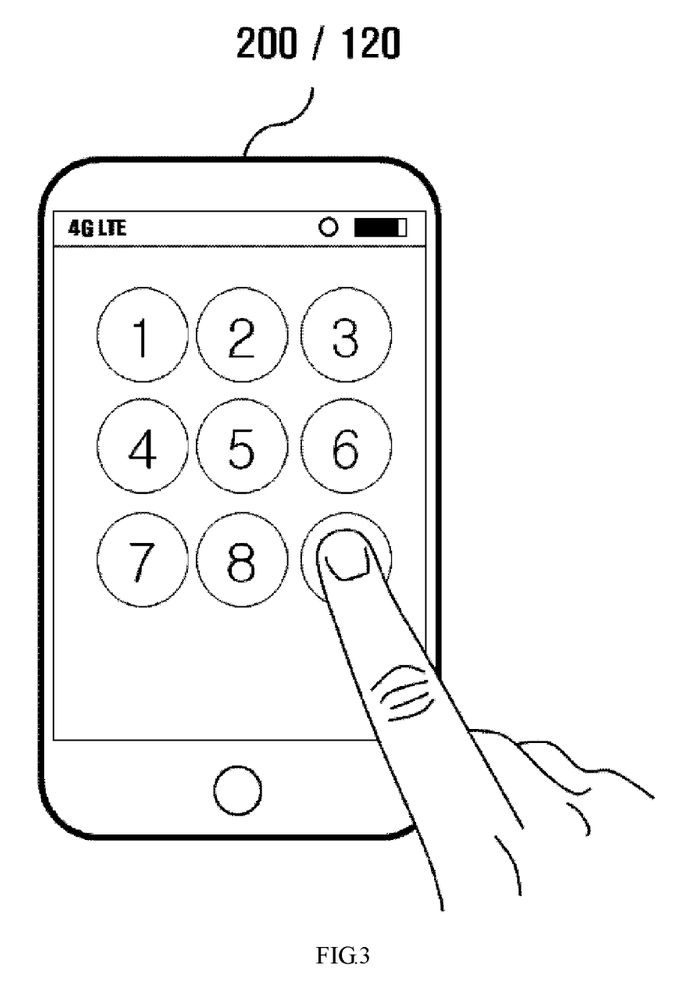
FIG. 3 is a diagram illustrating a user who performs inputting using an input unit or a remote terminal.
Figure 4:
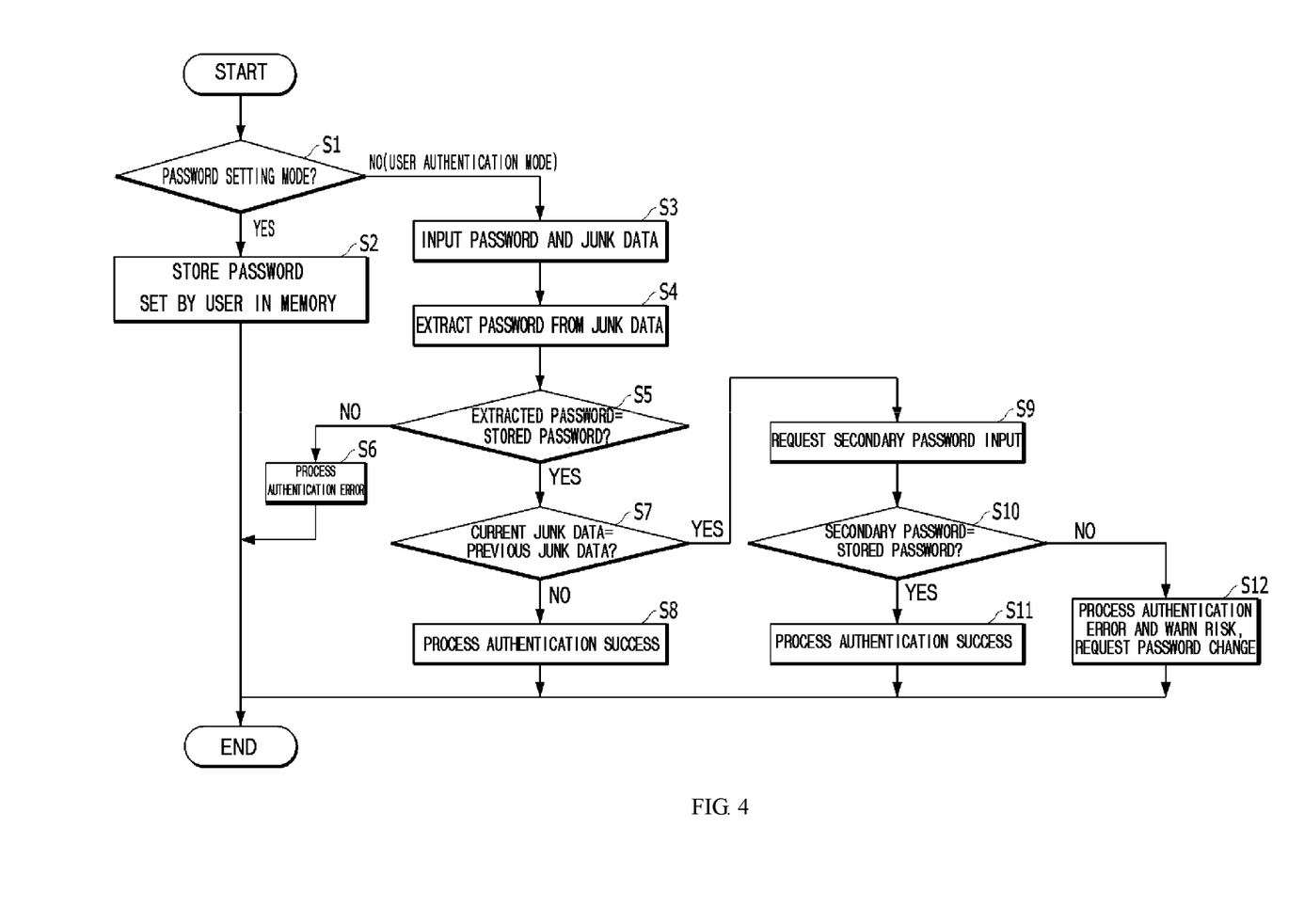
FIG. 4 is a flowchart illustrating a process of a user authentication method using junk data matching according to an embodiment of the present invention.

FIG. 3 is a diagram illustrating a user who performs inputting using an input unit or a remote terminal, and FIG. 4 is a flowchart illustrating a process of a user authentication method using junk data matching according to an embodiment of the present invention.

A user may input a password or junk data through the input unit 120 or the remote terminal 200 as illustrated in FIG. 3.

Although the input is illustrated by touching the number keys in FIG. 3, this is just an example, and the password and junk data may include letters, special characters, symbols, as well as numbers.

When the input unit 120 is a microphone, a user may input the password and junk data by voice.

The processor 110 may segment and convert inputted data into text data, and may use the text data as an input value. A well-known algorithm may be used to convert voice data into text.

Figure 5:
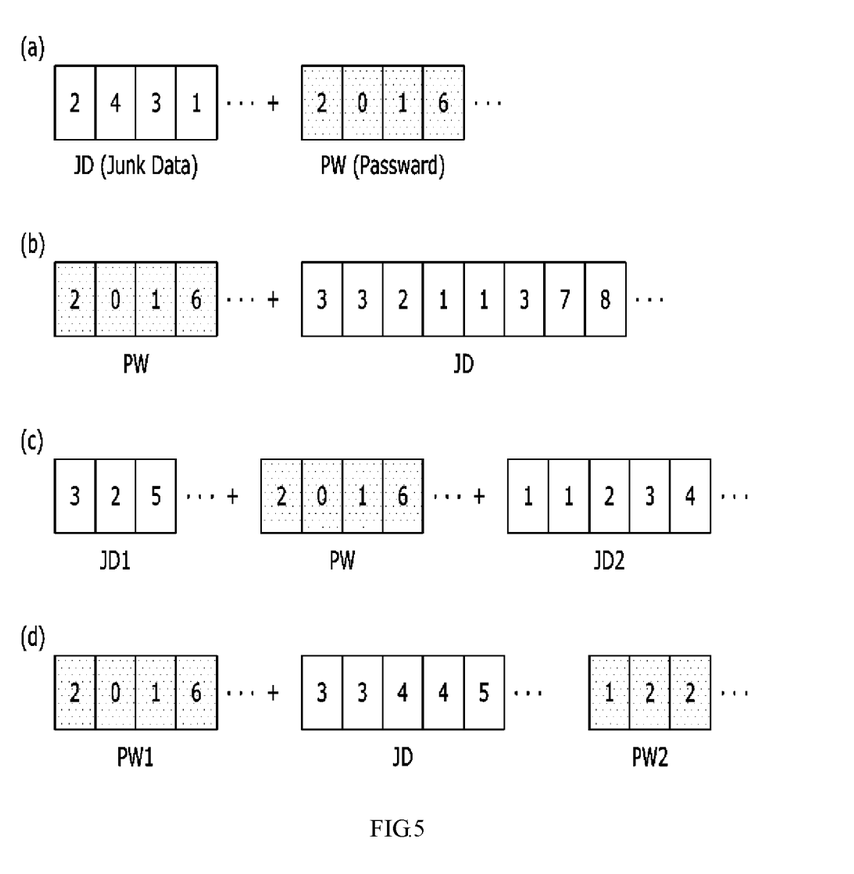
FIG. 5 is a diagram illustrating an example of a pattern of junk data generated by adding a random value to an actual password according to an embodiment of the present invention.
Figure 6:
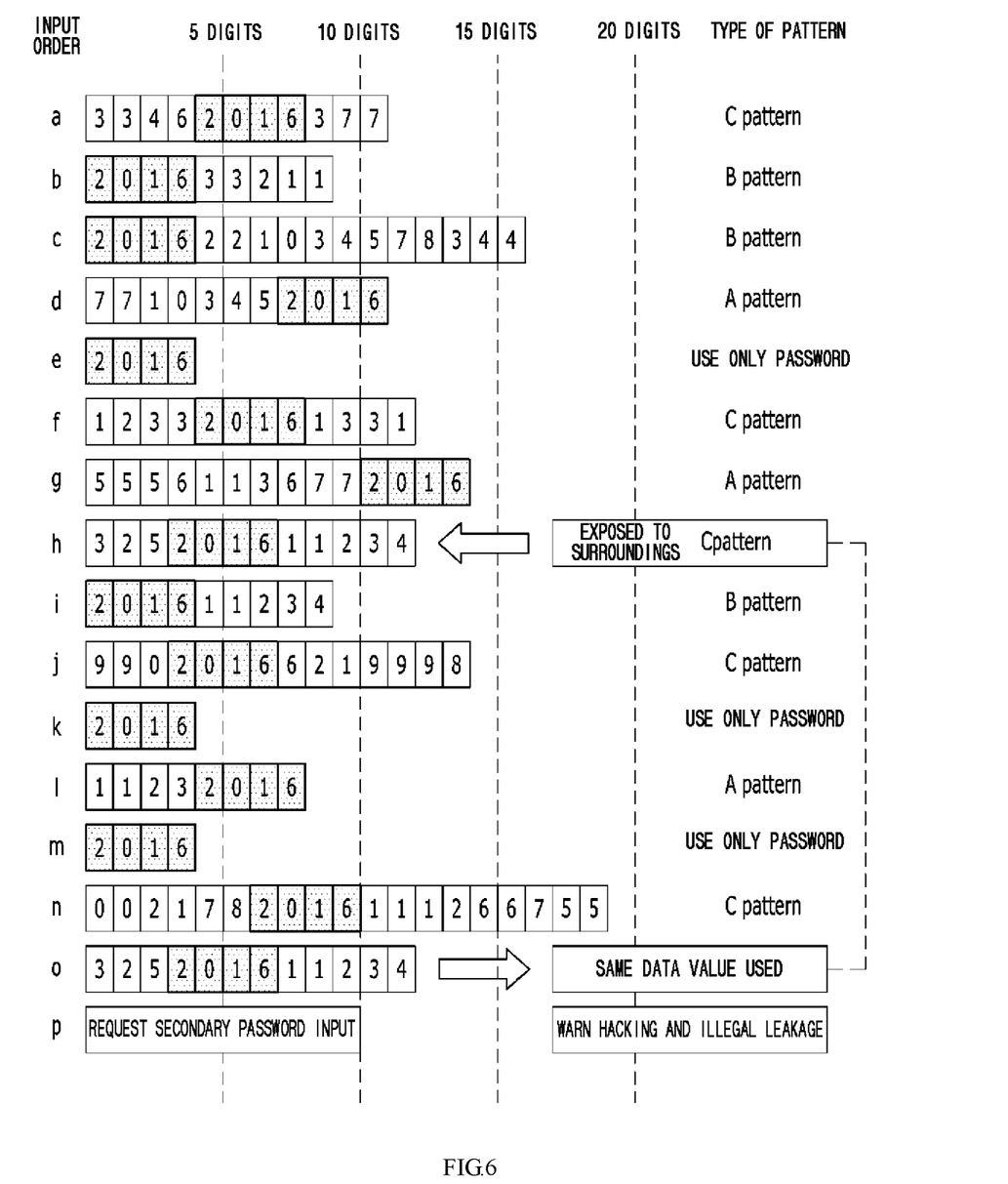
FIG. 6 is a diagram illustrating three patterns used for user authentication by inputting passwords and junk data according to an embodiment of the present invention, and examples used by illegal exposure or hacking.

FIG. 5 is a diagram illustrating an example of a pattern of junk data generated by adding a random value to an actual password according to an embodiment of the present invention, and FIG. 6 is a diagram illustrating three patterns used for user authentication by inputting passwords and junk data according to an embodiment of the present invention, and examples used by illegal exposure or hacking.

Hereinafter, a user authentication method using junk data matching according to an embodiment of the present invention will be described with reference to FIGS. 3 to 6.

When a user does not previously perform the password setting mode and thus requests the password setting for the first time or requests the password change, the processor 110 executes the password setting mode (S1).

Next, the processor 110 receives the value of the password set by the user, and stores the password value in the storage unit 140 (S2).

The password used in this embodiment is a password PW having a certain number of digits to be set by a user. However, when a password is inputted in the user authentication process, the password is inputted together with one or more junk data JD for hiding the password.

Since the junk data is generated by a user's unconscious and extemporary input operation unlike a password having a certain format and requirement that a user always needs to remember, the junk data is meaningless and does not include necessary information. Accordingly, the junk data is extemporaneously inputted, generated and used by randomly inputting a desired number of digits by a user before, after, or before and after the user inputs the password PW that is originally registered as the password by a user.

FIGS. 5A to 5D illustrate a pattern generated by the junk data JD inputted together with the password inputted by a user in the user authentication process. Here, FIG. 5A shows an example of a pattern including a 4-digit junk data JD and a 4-digit password next to the junk data JD. FIG. 5B shows an example of a pattern including a 4-digit password and an 8-digit junk data JD next to the 4-digit password. FIG. 5C shows an example of a pattern including a 3-digit first junk data JD1, a 4-digit password next to the first junk data JD1, and a 5-digit second junk data JD2 next to the password. FIG. 5D shows an example of a pattern including a four-digit first password PW1, a five-digit junk data JD next to the password PW1, and a three-digit second password PW2 next to the junk data JD.

The number of digits used for the password and the junk data as configured above is not particularly limited. It is preferable that the number of digits constituting the password is shorter in consideration of the convenience of a user. However, it is preferable that the number of digits constituting the password is 4 digits or more, which is the minimum unit of the password configuration. The digits constituting the junk data may be freely and extemporarily randomized from 1 to n, but considering the convenience of a user and the input time and assuming a guessing attack by another person, it is preferable to limit the number of actually inputted digits to 10 or less.

That is, the actual password to be remembered by a user may be shortly and conveniently used by a combination of four numbers, but the number (number of digits) of junk data to be added before, after, or before and after the password may be arbitrarily, randomly and freely generated and added by a user.

Considering the convenience of a user, 10 digits or less is convenient to use. However, as shown in FIGS. 5B, 5C and 5D, it is preferable that the number of the entire junk data including the password has a sufficiently long length of at least ten digits or more in order to increase the security. In the case of FIGS. 5B and 5C, except the 8 digits junk data used, the value of the actual password which a user needs to remember is only 4 digits. For reference, according to George A. Miller's research paper entitled "The Magic Number Seven, plus or minus Two" published in 1956, the general number of numbers that a person can memorize is reported as an average of seven digits. In this regard, the passwords shown in FIGS. 5B and 5C are passwords that satisfy both convenience and security.

Since the number of the junk data including the password is all 12 digits, the security is very good against the surrounding exposure or the memory of the other person. Among these 12 digits, since a user needs only to remember the four-digit number '2016' that corresponds to the actual password except the junk data, it can be seen that convenience is also good.

According to George Miller's research paper, a five-digit number having two digits less than a seven-digit number may be easily memorized by anyone, whereas a nine-digit number having two digits more than a seven-digit number cannot be easily memorized. That is, the password is easy to memorize to a user, but the password which is hidden by the junk data cannot be memorized even when being exposed and viewed from the side.

As in the cases of (c) and (n) of FIG. 6, when a long number of 16 or 19 digits is inputted due to a large number of observers in the vicinity, the long number is too long to be used as a password. However, since a user remembers only the password of 4 digits, he/she can easily input the long number combination without a burden. Also, even if a user deliberately induces surrounding exposure when inputting the password, the surrounding observers cannot find out the actual four passwords among these long number combinations. In addition, there is no way to memorize this long combination of numbers with human memory span and ability, thereby ensuring a safety against the surrounding exposure or shoulder surfing.

Hereinafter, the junk data including the password inputted by a user will be illustrated by the pattern as shown in FIG. 5C.

In the user authentication mode, the processor 110 receives a password PW, first junk data JD1 inputted before the password, and second junk data JD2 from a user through the input unit 120 (S3).

In this case, a user may not always input the junk data JD together with the password as described above. As in (e), (k), and (m) of FIG. 6, for example, when it is determined that the current situation is a safe situation requiring no security, such as a home or office where the junk data is not needed, it is possible to quickly and easily input only the actual password.

When comparing and analyzing in detail the use examples of collected junk data shown in FIG. 6, (e), (k) and (m) show the cases where only the actual password is used for authentication, which shows that the password is used in a safe place. On the other hand, (a), (c), (f), (g), (h), (j), (n) and (o) show the cases where the 4-digit password and the junk data of 6 or more digits, that is, 10 digits or more are inputted, which shows that the password is inputted in an unsafe or unstable state.

Particularly, in the case of (h) and (o), the 12 digits of the pass word and the junk data inputted together with the password are the same, and it is sure that the previously inputted (h) is inputted in an unstable state at an unsafe place. In this case, since the later inputted (o) is the same as (h), it is determined that (o) may be used by hacking (h) through the surrounding exposure, the hidden camera or the like. By using the junk data, an illegal use by hacking can be predicted to process the user authentication as an error, and a "hacking risk" warning can be posted (S7, S9)

As can be seen from the above example, it is possible to collect junk data and induce generation of junk data which are password error values that are frequently generated upon input of the password but are considered useless. Also, it is possible to find valuable data by storing, classifying and analyzing the junk data and to predict hacking and illegal exposure use using the junk data.

The processor 110 extracts the actual password except the first junk data JD1 and the second junk data JD2 from the junk data including the password inputted in the above pattern. For this, the processor 110 may use a pattern matching algorithm, a pattern recognition algorithm, or a string search algorithm such as Finite-state automaton based search, Brute Force Algorithm, Knuth-Morris-Pratt Algorithm and Rabin-Karp string algorithm (S4).

If a user inputs only the actual password without inputting the junk data JD as described above ((e), (k) and (m) of FIG. 6), the junk data JD is not detected and only the password is detected in operation S4.

The processor 110 checks whether or not the extracted password matches the password stored in the storage unit 140. When it is determined that the extracted password does not match the password stored in the storage unit 140, the processor 110 performs error processing because the extracted password is an invalid password, and displays that fact on the display unit 130 (S5, S6).

Even if a user inputs only the actual password without inputting the junk data JD, the processor 110 checks whether or not the extracted password matches the password stored in the storage unit 140. When it is determined that the passwords does not match each other, the processor 110 performs error processing because the extracted password is an invalid password, and displays that fact on the display unit 130.

However, when it is determined that the extracted password matches the password stored in the storage unit 140, the processor 110 checks whether or not the password including the junk data JD matches the password stored in the storage unit 140 which is a password including the junk data JD inputted by a user in a previous authentication process. Then, when it is determined that the passwords does not match each other, the user authentication is processed to be successful (S7, S8).

The reason for checking whether or not the currently inputted password including the junk data JD matches the password including the junk data JD inputted by a user in the previous authentication process and stored in the storage unit 140 is because an illegal user may recognize the entire password including the junk data with the first junk data JD1, the password PW and the second junk data as one password and may intactly input '325 2016 11234' when the password previously used by as user is exposed to the illegal user by exposure, shoulder surfing, hidden camera or other means ((o) of FIG. 6). In this regard, the password which a user inputs needs to differ from the previously inputted password in the number of digits or at least one of the random numbers (or letters, special characters, symbols) constituting the first junk data JD1 and the second junk data JD2.

When determining whether or not the inputted password including the junk data JD matches the password including the junk data JD inputted in a previous authentication process and stored in the storage unit 140, it is not necessary to determine whether or not the inputted password including the junk data JD matches all the passwords including the junk data JD which were inputted in the past. It is also possible to compare and determine whether or not the inputted password including the junk data JD matches passwords including the junk data JD which include just a previous password and are previously inputted within a predetermined number or time.

Accordingly, as a result of the checking, when it is determined that the password including the junk data JD matches the password including the junk data JD stored in the storage unit 140, the processor 110 may determine that the currently inputted password is inputted by an illegal user or is inputted by a mistake of a user, and may request a secondary password input (S9) (see (p) of FIG. 6).

On the other hand, when the number of digits of the password including the junk data currently inputted by a user is equal to or greater than the critical length and the number of digits matching the password used in the past stored in the storage unit 140 corresponds to the critical length, for example, when the inputted password including the junk data is 14 digits (see (j) of FIG. 6) and the number of matching digits is 9 or more, it is determined that the currently inputted password is the same as the password used in the past even if the two passwords do not completely match each other as described above. In this case, since the currently inputted password is inputted by an illegal user or is inputted by the user's mistake (accident), the processor 110 may request a secondary password input (S9) (see (p) of FIG. 6).

When the length of the password including the junk data currently inputted by a user is shorter than the critical length ((b), (i) and (l) of FIG. 6), or only the password is used without inputting the junk data ((e), (k) and (m) of FIG. 6), it is determined that the password is used in a safe place. When the length of digits of the password including the junk data is longer than the critical length, it is determined that the password is inputted in a state where the surroundings are unsafe.

On the other hand, when 9 digits of the currently inputted password are the same as a previously inputted password, according to Miller's paper introduced above, 9 digits exceed the range that an ordinary person can memorize. Accordingly, it may be determined that the currently inputted password is inputted by hacking.

More specifically, for example, when the current password inputted by a user is '325 2016 11238' including the first junk data JD1, the password PW and the second junk data JD2 and the password used in the past and stored in the storage unit 140 is '325 2016 11234' ((h) of FIG. 6), the number of digits of the currently inputted password is equal to that of the password used in the past in that the number of digits of the two passwords is 11 digits but one digit is different. In this case, however, it is determined that the same password as the past password is inputted, and the authentication is rejected by determining that the current password is inputted by hacking or the like. This is because the entire password can be intactly used after the password is photographed with a hidden camera or the like (FIG. 6 (o)) but a portion of the password may be intentionally changed or omitted.

More specifically, the human brain cannot memorize and reproduce the 11 digits '32520161123' except for one digit or the 10 digits '3252016112' except for 2 digits. Accordingly, when this combination of long numbers is the same as the number used in the past, it is not a combination of numbers that can be remembered and used without hacking.

From the same point of view, assuming a user inputs a 15-digit password including junk data, if the 15-digit password inputted completely matches a password of the past, or one of the 15 digits is different from each other and the 14 digits match each other, or two of the 15 digits are different from each other and the 13 digits match each other, . . . , or six of the 15 digits are different from each other and the 9 digits match each other, then it is determined that the inputted password is hacked and a secondary password input is requested (S9).

Even if the digits do not match each other consecutively, when a total of 9 or more digits are sequentially matched, it may be determined as hacking and a secondary password input may be requested (S9).

The secondary password means only the password PW excluding all the junk data from the first junk data JD1, the password PW and the second junk data JD2. A user may recognize this fact, and may input the four-digit number '2016' that is the actual password. On the other hand, since an illegal user knows the entire number of junk data including the password but cannot know the actual password included therein, the illegal user inputs the 12-digit number including the first junk data JD1, the password PW and the second junk data JD2. Otherwise, the illegal user arbitrarily selects and inputs digits of the password value among the entire 12-digit numbers.

The processor 110 compares the inputted secondary password with the password stored in the storage unit 140. When it is determined that the secondary password matches the password stored in the storage unit 140, the processor 110 processes the user authentication as a success, and when it is determined that the secondary password does not match the password stored in the storage unit 140, the processor 110 processes the user authentication as an error (S10 to S12).

In this case, when the inputted secondary password does not match the password stored in the storage unit 140, the processor 110 determines that the password is illegally leaked and may request a user to change the password through the display unit 130. Thus, it is possible to predict and notify of illegal hacking, thereby enhancing prevention and security.

On the other hand, when the input secondary password does not match the password stored in the storage unit 140, there may be hacking or a user's mistake. Accordingly, the secondary password input may be requested a preset number of times (e.g., three times). In this case, when the inputted secondary passwords do not continuously match the password stored in the storage unit 140. The processor 110 determines that the just previously inputted password is illegally leaked (hacked), and processes the user authentication as an error. Then, the processor 110 may notify a user of the possibility of illegal leakage through the display unit 130, and may request a password change.

The present invention can improve both security and convenience by separating and extracting a password formed of a certain number of digits excluding one or more junk data formed of random digits and random numbers from a password including junk data inputted from a user, and by processing the user authentication as a failure even though the extracted password matches a previously stored password when the inputted password including junk data matches a previously inputted password by at least a certain length or more.

Since the security becomes higher but the convenience becomes lower when the password become longer, the number of digits of the password cannot be unlimitedly increase to enhance the security. However, according to an embodiment of the present invention, a user memorizes and uses only a short password, but inputs junk data before, after, or before and after a password at the time of inputting the password such that the short password is not detected by another observer. In this case, the junk data is not intentionally remember but is unconsciously and extemporaneously created. Also, the junk data is freely inputted by a random number of random digits having no information and meaning. Accordingly, both convenience and security can be significantly enhanced.

Also, the present invention can be simply applied to door locks of doorways, vehicle door open/close devices, safe door locks, personal terminals such as notebook computers, tablet PCs and smart phones, wearable devices such as smart watches, locks of devices interlocked with IoT, Internet user authentication systems such as a computer connected to a server via a wired/wireless network, a smart phone, a tablet PC, a notebook computer and a smart TV, online authentication of e-commerce or financial service of financial institutions, and systems such as automatic teller machines and civil affair document issuer by upgrading only software without change of the existing structure or replacement of devices.

In addition, a user can freely use an old password as it is without replacing the old password or making the old password difficult, complicated and long. Thus, a user is free from the password error or password forgetting and loss, and does not need to worry about the surrounding exposure. Accordingly, a user can use the old password without regard to place. Also, since the current familiar password input method can be used, there is no resistance to the adaptation of new device, new method, and new authentication system and no operation error, but there are familiarity and familiar advantages, thereby enabling quick input. Accordingly, it is possible to secure both safety and convenience against surrounding exposure, shoulder surfing, guessing attack, and hidden camera exposure.

In particular, although an OTP or a random virtual keyboard can avoid keylogging, since only a short password value is inputted when a password is inputted, the OTP or the random virtual keyboard has security limitations in that surrounding exposure or shoulder surfing cannot be prevented. However, according to an embodiment of the present invention, a random number of random extemporary junk data is together inputted to the password whenever the password is inputted, and thus the password can be concealed in a random combination of numbers which is irregularly and randomly created. Accordingly, even when the password input motion is exposed to surrounding people, there is no way for surrounding people to know the actual password in the junk data that contains the password and to remember the password that is always changed. Accordingly, the security and convenience can be increased, and the safety against surrounding exposure, shoulder surfing, and hidden camera hacking which cannot be fundamentally prevented with current technologies can be together secured, and the awkward atmosphere and anxiety experienced when entering passwords in a place where surrounding people are together can also be removed.

Also, since the user authenticated can be performed only by a password without inputting junk data, it is possible to perform user authentication by simply and quickly inputting a short password as it is in a safe situation such as a home or office that does not need special security. Accordingly, there is convenience of selective use in that either security or simplicity can be increased according to user's selection.

Also, unlike the authentication method using the OTP or the random virtual keyboard which cannot utilize the error data generated when the password is inputted, even if the password is hacked by a hidden camera, shoulder surfing, exposure or the like, it is possible to recognize in advance a hacked password and to issue a danger warning by comparing the currently inputted junk data with the stored junk data previously inputted. Thereafter, since the user authentication is surely performed by secondarily requesting the actual password input excluding the junk data, it is possible to prevent and block illegal user authentication by exposure or hacking.

In particular, IoT devices or wearable products in which personal information is stored and shared in real-time are frequently used in an open and unsafe space where a user is unconscious of surroundings. Also, with the development of IoT technology, voice, graphics and images in addition to text input are used, the possibility of exposure of the password to the surroundings further increases upon unlocking of a controller or a device or user authentication. However, according to an embodiment of the present invention, since the password is used while being hidden in the junk data generated by inputting random values, even if the screen, voice, and operation for inputting the password are exposed to the surroundings, other persons cannot recognize the password. Accordingly, the wearable products or IoT devices can be used so as not to be awkward even in front of many people, and "surrounding exposure upon device use" that is the first security-related anxiety of users can be eliminated, thereby improving the reliability of the products and enhancing both the convenience and security.

The above-described methods may be implemented in the form of program instructions that can be performed through various computer means, and may be recorded on a computer readable medium. The computer readable medium may include program instructions, data files, and data structures solely or in combination. The program instructions that are recorded on the medium may be specially designed and configure for the present disclosure, or may be known and available to computer software providers. Examples of the computer readable recording media may include hardware devices specially configured to store and perform program instructions, such as magnetic media, such as a hard disk, a floppy disk, and a magnetic tape, an optical media, such as a CD-ROM and a DVD, a magneto-optical media, such as a floptical disk, a ROM, a RAM, and a flash memory. Examples of the program instructions may include not only machine codes that are made by compilers but also high-class language codes that can be executed by computers using interpreters and the like.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A user authentication method using a user authentication system, the method comprising:
   (a) receiving a password comprising junk data from a user where the junk data are comprised before, after, or before and after the password;
   (b) extracting the password excluding the junk data from the received password comprising the junk data; and
   (c) processing user authentication as a failure even though the extracted password matches a previously stored password when the password comprising the junk data matches, by a critical length, the previously stored password comprising junk data inputted in the past.

2. The user authentication method of claim 1, wherein in the processing of the user authentication, when the length of the password comprising the junk data inputted from a user is equal to or greater than the critical length, it is determined whether or not the password comprising the junk data matches the previously stored password comprising junk data inputted in the past,
   wherein when the length of the password comprising the junk data inputted from a user is less than the critical length, the determination of whether or not the password comprising the junk data matches the previously stored password comprising junk data inputted in the past is omitted, and when the extracted password matches the previously stored password in a storage unit, the user authentication is processed as a success.

3. The user authentication method of claim 1, wherein in the processing of the user authentication, the critical length is nine or more digits, and
   it is determined whether or not the password comprising the junk data matches the previously stored password comprising junk data inputted in the past, wherein when the password comprising the junk data continuously or discontinuously matches, by the critical length, the previously stored password comprising the junk data inputted in the past,
   the user authentication is processed as a failure even though the password matches the previously stored password in a storage unit.

4. The user authentication method of claim 1, wherein a pattern of junk data comprising the password comprises any one of:
   a pattern comprising junk data formed of a plurality of digits and a password formed of four or more digits;
   a pattern comprising first junk data formed of a plurality of digits, a password formed of four or more digits, and second junk data formed of a plurality of digits; and
   a pattern comprising a first password formed of three or more digits, junk data formed of a plurality of digits, and a second password formed of three or more digits.

5. The user authentication method of claim 1, wherein in the extracting of the password excluding the junk data, one of a string search algorithm, a pattern matching algorithm and a pattern recognition algorithm is used.

6. The user authentication method of claim 1, after the processing of the user authentication, further comprising:
   (d) displaying a message instructing to input only the password excluding junk data; and
   (e) determining whether or not the password matches the previously stored password in the storage unit when a password is re-inputted from a user, and when the passwords match each other, the user authentication is processed as a success.

7. The user authentication method of claim 6, wherein in the determining of whether or not the password matches the previously stored password, when the password re-inputted from a user does not match the previously stored password in the storage unit, a hacking risk warning process is performed.

8. A user authentication system using junk data matching, the system comprising:
   an input unit receiving a password and junk data from a user;
   a storage unit storing instructions to be executed by a processor; and
   the processor sequentially executing the instructions loaded on the storage unit,
   wherein the processor, if receiving a password comprising junk data from a user where the junk data are comprised before, after, or before and after the password, extracts the password excluding the junk data from the received password comprising the junk data, and processes user authentication as a failure even though the extracted password matches a previously stored password in the storage unit when the password comprising the junk data matches, by a critical length, the previously stored password comprising junk data inputted in the past.

9. The user authentication system of claim 8, wherein when the length of the password comprising the junk data inputted from a user is equal to or greater than the critical length, the processor determines whether or not the password comprising the junk data matches the previously stored password comprising junk data inputted in the past,
   wherein when the length of the password comprising the junk data inputted from a user is less than the critical length, the processor omits the determination of whether or not the password comprising the junk data matches the previously stored password comprising junk data inputted in the past, and
   when the extracted password matches the previously stored password in the storage unit, the processor processes the user authentication as a success.

10. A user authentication system using junk data matching, the system comprising:
    a communication adapter transmitting and receiving data through a network;
    a storage unit storing instructions to be executed by a processor; and
    the processor sequentially executing the instructions loaded on the storage unit, wherein the communication adapter receives a password comprising junk data from a remote terminal connected through the network where the junk data are comprised before, after, or before and after the password, and the processor extracts the password excluding the junk data from the received password comprising the junk data, and processes user authentication as a failure even though the extracted password matches a previously stored password in the storage unit when the password comprising the junk data matches, by a critical length, the previously stored password comprising junk data inputted in the past.

11. The user authentication system of claim 9, wherein the processor determines whether or not the password comprising the junk data matches the previously stored password comprising junk data inputted in the past, and when the password comprising the junk data continuously or discontinuously matches, by the critical length, the previously stored password comprising the junk data inputted in the past, the processor processes the user authentication as a failure even though the extracted password matches the previously stored password in the storage unit, and the critical length is nine or more digits.

12. The user authentication system of claim 10, wherein when the length of the password comprising the junk data inputted from a user is equal to or greater than the critical length, the processor determines whether or not the password comprising the junk data matches the previously stored password comprising junk data inputted in the past, wherein when the length of the password comprising the junk data inputted from a user is less than the critical length, the processor omits the determination of whether or not the password comprising the junk data matches the previously stored password comprising junk data inputted in the past, and when the extracted password matches the previously stored password in the storage unit, the processor processes the user authentication as a success.

13. The user authentication system of claim 12, wherein the processor determines whether or not the password comprising the junk data matches the previously stored password comprising junk data inputted in the past, and when the password comprising the junk data continuously or discontinuously matches, by the critical length, the previously stored password comprising the junk data inputted in the past, the processor processes the user authentication as a failure even though the extracted password matches the previously stored password in the storage unit, and the critical length is nine or more digits.

* * * * *